United States Patent
Wright et al.

(10) Patent No.: US 9,351,158 B2
(45) Date of Patent: May 24, 2016

(54) METHOD FOR WIRELESS EASY CONNECT

(71) Applicant: Microchip Technology Incorporated, Chandler, AZ (US)

(72) Inventors: Mark Wright, Cupertino, CA (US); Nohee Ko, Mountain View, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 100 days.

(21) Appl. No.: 14/190,437

(22) Filed: Feb. 26, 2014

(65) Prior Publication Data

US 2014/0254577 A1    Sep. 11, 2014

Related U.S. Application Data

(60) Provisional application No. 61/775,373, filed on Mar. 8, 2013.

(51) Int. Cl.
| | |
|---|---|
| H04W 4/00 | (2009.01) |
| H04W 12/04 | (2009.01) |
| H04W 84/12 | (2009.01) |
| H04L 29/06 | (2006.01) |

(52) U.S. Cl.
CPC ........... *H04W 12/04* (2013.01); *H04L 63/0853* (2013.01); *H04L 63/18* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 5,586,260 A | 12/1996 | Hu | 726/12 |
| 2002/0063633 A1* | 5/2002 | Park | 340/825.69 |
| 2006/0251256 A1* | 11/2006 | Asokan et al. | 380/270 |
| 2007/0101136 A1* | 5/2007 | Lai et al. | 713/168 |
| 2010/0205655 A1* | 8/2010 | Mokuya | 726/4 |
| 2013/0173811 A1* | 7/2013 | Ha et al. | 709/227 |
| 2013/0286889 A1* | 10/2013 | Cherian et al. | 370/254 |

FOREIGN PATENT DOCUMENTS

| | | | |
|---|---|---|---|
| EP | 2611079 A1 | 7/2013 | H04L 12/28 |
| WO | 2006/106393 A2 | 10/2006 | H04L 9/08 |

OTHER PUBLICATIONS

WiFi Alliance, Wi-Fi Protected Setup Specification, Version 1.0h, 110 pages, Dec. 2006.*
International Search Report and Written Opinion, Application No. PCT/US2014/019487, 10 pages, Sep. 25, 2014.

* cited by examiner

*Primary Examiner* — Frank Duong
(74) *Attorney, Agent, or Firm* — Slayden Grubert Beard PLLC

(57) ABSTRACT

A consumer appliance or product having a Wi-Fi embedded device may be connected to a wireless local area network (WLAN) without users having to change networks on their "personal device" e.g., personal computer, tablet computer, smart phone, etc., or having to access the Wi-Fi embedded device in any way, e.g., transparent setup and connection to the user. A specially transmitted data packet, beacon, or other broadcast packet from a client connected to wireless local area network (WLAN) may be used to send an encrypted equivalent of a last stage Wi-Fi protected setup (WPS) transfer that provides network commissioning information to the Wi-Fi embedded device so that it may automatically connect to the WLAN.

38 Claims, 14 Drawing Sheets

Figure 1 (Prior Technology)

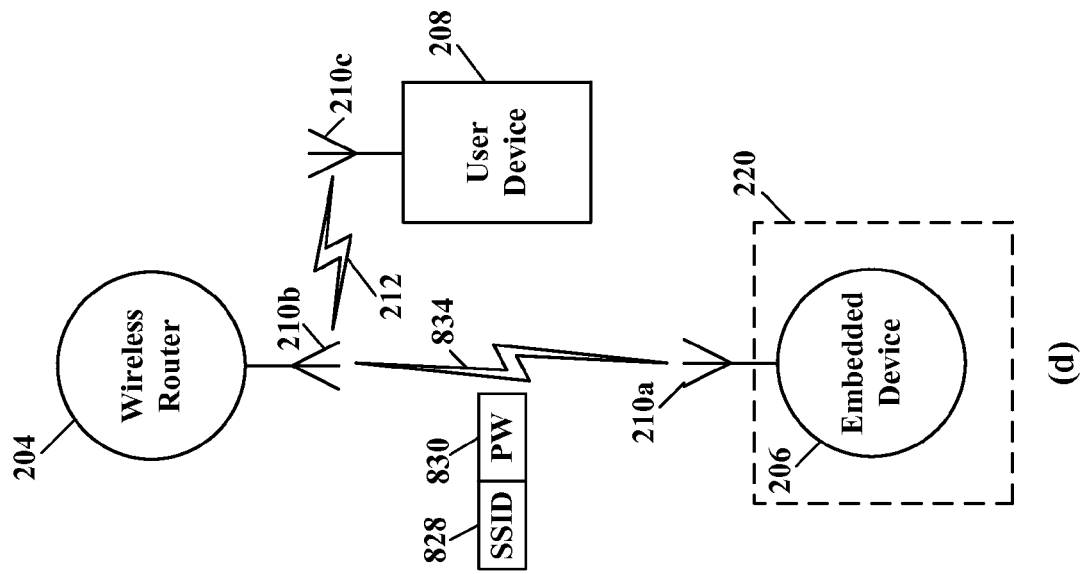
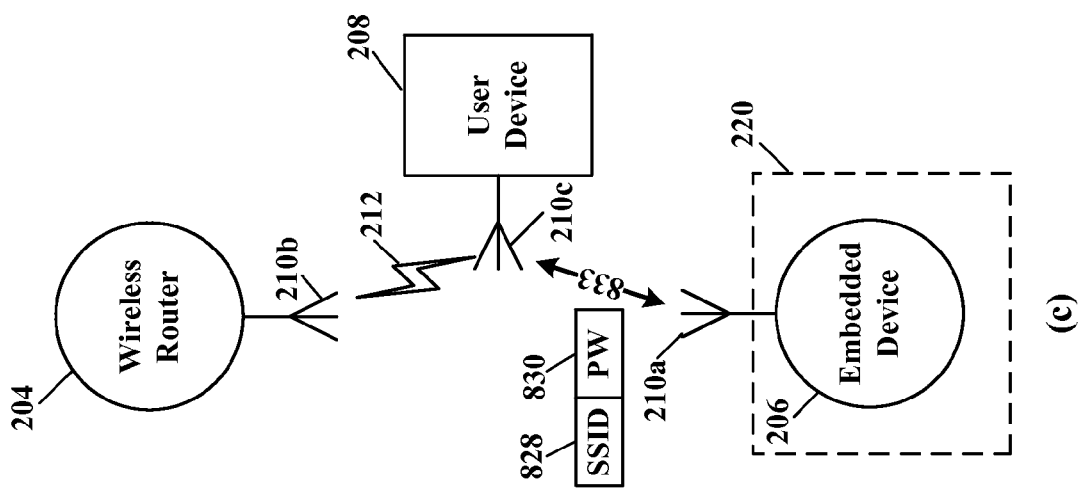
Figure 8A

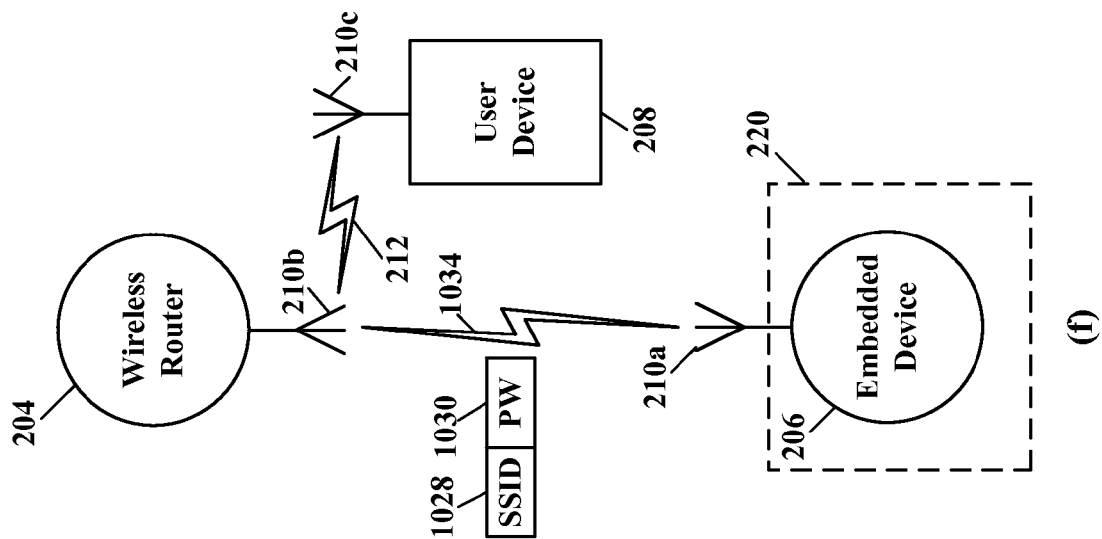
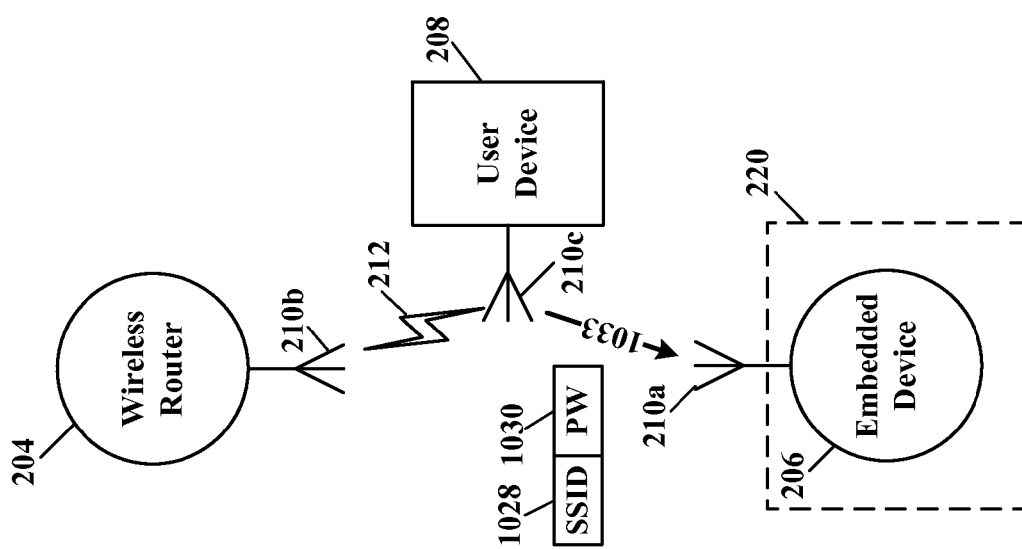
Figure 10B

METHOD FOR WIRELESS EASY CONNECT

RELATED PATENT APPLICATION

This application claims priority to commonly owned U.S. Provisional Patent Application Ser. No. 61/775,373; filed Mar. 8, 2013; which is hereby incorporated by reference herein for all purposes.

TECHNICAL FIELD

The present disclosure relates to a method and apparatus for connecting a product or appliance having a wireless embedded device to a wireless local area network (WLAN), and, in particular, the wireless embedded device being configured for connection to the WLAN transparently to a user.

BACKGROUND

Products and appliances, e.g., toasters, refrigerators, ovens, washing machines, dryers, thermostats, security systems, baby monitors, telephone answering machines, electric car chargers, sprinkler systems, light bulbs, etc., having wireless, e.g., Wi-Fi (WI-FI is a registered trademark of WI-FI Alliance Corporation California, 10900-B Stonelake Boulevard, Suite 126, Austin, TEXAS 78759), embedded devices are becoming more and more prevalent and are being used to advantage by consumers. Wi-Fi is an acronym for a technology that allows an electronic device to transmit and receive data or connect to the Internet wirelessly using radio waves. The Wi-Fi Alliance defines Wi-Fi as any "wireless local area network (WLAN) products that are based on the Institute of Electrical and Electronics Engineers' (IEEE) 802.11 standards." However, procedures for connecting a Wi-Fi embedded device to a WLAN may be difficult for a user or not intuitive.

Referring to FIG. 1, depicted are schematic communications diagrams of a prior technology method for easy configuration of a Wi-Fi embedded device so that it may become a client of a specific wireless local area network (WLAN). Shown in FIG. 1(a), a wireless router 104 of a wireless local area network (WLAN) has a radio frequency (RF) antenna 110b and is adapted to wirelessly communicate using a radio channel 112 to an existing client user device 108 having a RF antenna 110c. An embedded device 106 having a RF antenna 110a is not able to communicate with the wireless router 104 because it does not yet have the WLAN service set identifier (SSID) necessary to join the basic service set (BSS) of the WLAN and become a wireless client thereof. The BSS is a component of the IEEE 802.11 WLAN architecture, described in the IEEE 802.11 standards which are incorporated by reference herein for all purposes. All wireless clients of the wireless router 104 must have the same SSID as the one programmed into the wireless router 104 to enable communications therebetween. For this example, the user device 108 may be a smart phone having Wi-Fi capabilities.

Shown in FIG. 1(b), the user device 108 must disconnect from the wireless router 104 in order to connect to the embedded device 106. Loading of the SSID to the embedded device 106 may commence once the user device 108 connects thereto. This wireless connection therebetween may either be by ad hoc networking or a software enabled access point (SoftAP) using the user device 108. SoftAP configures a smart phone (user device 108) into a client radio and wirelessly communicate using a radio channel 114 as an Access Point to serve other wireless devices that do not have a data connection otherwise. Thus the embedded device 106 when in the vicinity of the SoftAP enabled device (user device 108) may be programmed with the SSID of the wireless router 104 by the user device 108, either manually or automatically through an application program (App).

Shown in FIG. 1(c), once the embedded device 106 has been programmed with the SSID of the wireless router 104, the embedded device 106 can become a client of the wireless router 104 and wirelessly communicate using a radio channel 116 to the wireless router 104. The user device 108 may also reestablish its wireless communication using the radio channel 112 back to the wireless router 104. The aforementioned steps may be cumbersome to those not familiar with network setups and must also disconnect the user device 108 from the wireless router 104 and Internet access during SSID programming of the embedded device 106.

SUMMARY

Therefore a need exists for a simplified way to automatically connect a product or appliance having a Wi-Fi embedded device to a WLAN.

According to an embodiment, a method for connecting a wireless device to a wireless network may comprise the steps of: listening for a trigger code when the wireless device may be powered on; sending the trigger code from a user device; receiving the trigger code with the wireless device; transmitting recognition information from the wireless device to the user device; creating a pair-wise key from the recognition information; handshaking on the pair-wise key between the wireless device and the user device; sending wireless router access information from the user device; receiving the wireless router access information with the wireless device; and sending the wireless router access information from the wireless device to the wireless router to join the wireless network as a client.

According to a further embodiment of the method, the trigger code may be sent through a wireless router of the wireless network. According to a further embodiment of the method, the wireless router access information may be a payload that may comprise a service set identification (SSID) and a password (PW). According to a further embodiment of the method, may comprise the steps of: encrypting the wireless router access information before the step of sending; and decrypting the wireless router access information after the step of receiving the wireless router access information. According to a further embodiment of the method, the step of sending the wireless router access information from the wireless device to the wireless router may comprise the steps of changing mode of the wireless device to a client station and then sending the wireless router access information from the wireless device to the wireless router to join the wireless network. According to a further embodiment of the method, the wireless network may be a wireless local area network (WLAN).

According to a further embodiment of the method, the wireless device may be embedded in a product. According to a further embodiment of the method, the product may be selected from the group consisting of a thermostat, a security system, a baby monitor, a telephone answering machine, an electric car charger, a sprinkler system, and a light. According to a further embodiment of the method, the wireless device may be embedded in an appliance. According to a further embodiment of the method, the appliance may be selected from the group consisting of a toaster, refrigerator, oven, washing machine, a warming tray, a coffee pot, an iron, a vacuum, and a clothes dryer. According to a further embodiment of the method, the user device may be a smart phone.

According to a further embodiment of the method, the user device may be selected from the group consisting of a personal computer, a laptop computer, a tablet computer, a game box, and a smart television.

According to another embodiment, a method for connecting a wireless device to a wireless network may comprise the steps of: listening for a trigger code when the wireless device may be powered on; sending connection information that may comprise a trigger code and a payload from a user device, wherein the payload may comprise wireless router access information; receiving the connection information with the wireless device; and sending the wireless router access information from the wireless device to the wireless router to join the wireless network as a client.

According to a further embodiment of the method, the trigger code and the payload may be sent through a wireless router of the wireless network. According to a further embodiment of the method, the wireless router access information may comprise a service set identification (SSID) and a password (PW). According to a further embodiment of the method, may comprise the steps of: encrypting the payload before the step of sending; and decrypting the payload after the step of receiving the connection information. According to a further embodiment of the method, the step of sending the wireless router access information from the wireless device to the wireless router may comprise the steps of changing a mode of the wireless device to a client station and then sending the wireless router access information from the client station wireless device to the wireless router to join the wireless network According to a further embodiment of the method, the wireless network may be a wireless local area network (WLAN).

According to a further embodiment of the method, the wireless device may be embedded in a product. According to a further embodiment of the method, the product may be selected from the group consisting of a thermostat, a security system, a baby monitor, a telephone answering machine, an electric car charger, a sprinkler system, and a light. According to a further embodiment of the method, the wireless device may be embedded in an appliance. According to a further embodiment of the method, the appliance may be selected from the group consisting of a toaster, refrigerator, oven, washing machine, a warming tray, a coffee pot, an iron, a vacuum, and a clothes dryer. According to a further embodiment of the method, the user device may be a smart phone. According to a further embodiment of the method, the user device may be selected from the group consisting of a personal computer, a laptop computer, a tablet computer, a game box, and a smart television.

According to yet another embodiment, a method for connecting a wireless device to a wireless network may comprise the steps of: sending connection information from the wireless device; listening for the connection information with a user device; verifying validity of the connection information; connecting the user device to the wireless device when the connection information may be validated; sending wireless router access information from the user device; receiving the wireless router access information with the embedded device; and sending the wireless router access information from the wireless device to the wireless router to join the wireless network as a client.

According to a further embodiment of the method, the connection information may comprise beacons having a specific object identifier (OID) and embedded device identification (ID). According to a further embodiment of the method, the step of listening for the connection information from the wireless device may comprise the steps of scanning channels with the user device and listening for the beacons having the specific OID and ID. According to a further embodiment of the method, wireless router access information may comprise a service set identification (SSID) and a password (PW). According to a further embodiment of the method, may comprise the steps of: encrypting the wireless router access information before the step of sending from the user device; and decrypting the wireless router access information after the step of receiving with the embedded device. According to a further embodiment of the method, the step of sending the wireless router access information from the wireless device to the wireless router may comprise the steps of changing a mode of the wireless device to a client station and then sending the wireless router access information from the client station wireless device to the wireless router to join the wireless network. According to a further embodiment of the method, the wireless network may be a wireless local area network (WLAN). According to a further embodiment of the method, the wireless device may be embedded in a product.

According to a further embodiment of the method, the product may be selected from the group consisting of a thermostat, a security system, a baby monitor, a telephone answering machine, an electric car charger, a sprinkler system, and a light. According to a further embodiment of the method, the wireless device may be embedded in an appliance. According to a further embodiment of the method, the appliance may be selected from the group consisting of a toaster, refrigerator, oven, washing machine, a warming tray, a coffee pot, an iron, a vacuum, and a clothes dryer. According to a further embodiment of the method, the user device may be a smart phone. According to a further embodiment of the method, the user device may be selected from the group consisting of a personal computer, a laptop computer, a tablet computer, a game box, and a smart television. According to a further embodiment of the method, the step of verifying validity of the connection information may comprise the steps of: sending the embedded device identification (ID) to a verification server; and receiving a key from the verification server for the embedded device when the ID may be verified. According to a further embodiment of the method, may comprise the step of sending the wireless router access information and the key to the embedded device. According to a further embodiment of the method, the verification server may be an Internet cloud server.

BRIEF DESCRIPTION OF THE DRAWINGS

A more complete understanding of the present disclosure may be acquired by referring to the following description taken in conjunction with the accompanying drawings wherein:

FIGS. 7, 8 and 8A illustrate schematic communications and process flow diagrams of a connection protocol for wireless easy connect, according to yet another specific example embodiment of this disclosure; and FIGS. 9, 10, 10A and 10B illustrate schematic communications and process flow diagrams of a connection protocol for wireless easy connect, according to still another specific example embodiment of this disclosure.

Figure 1:
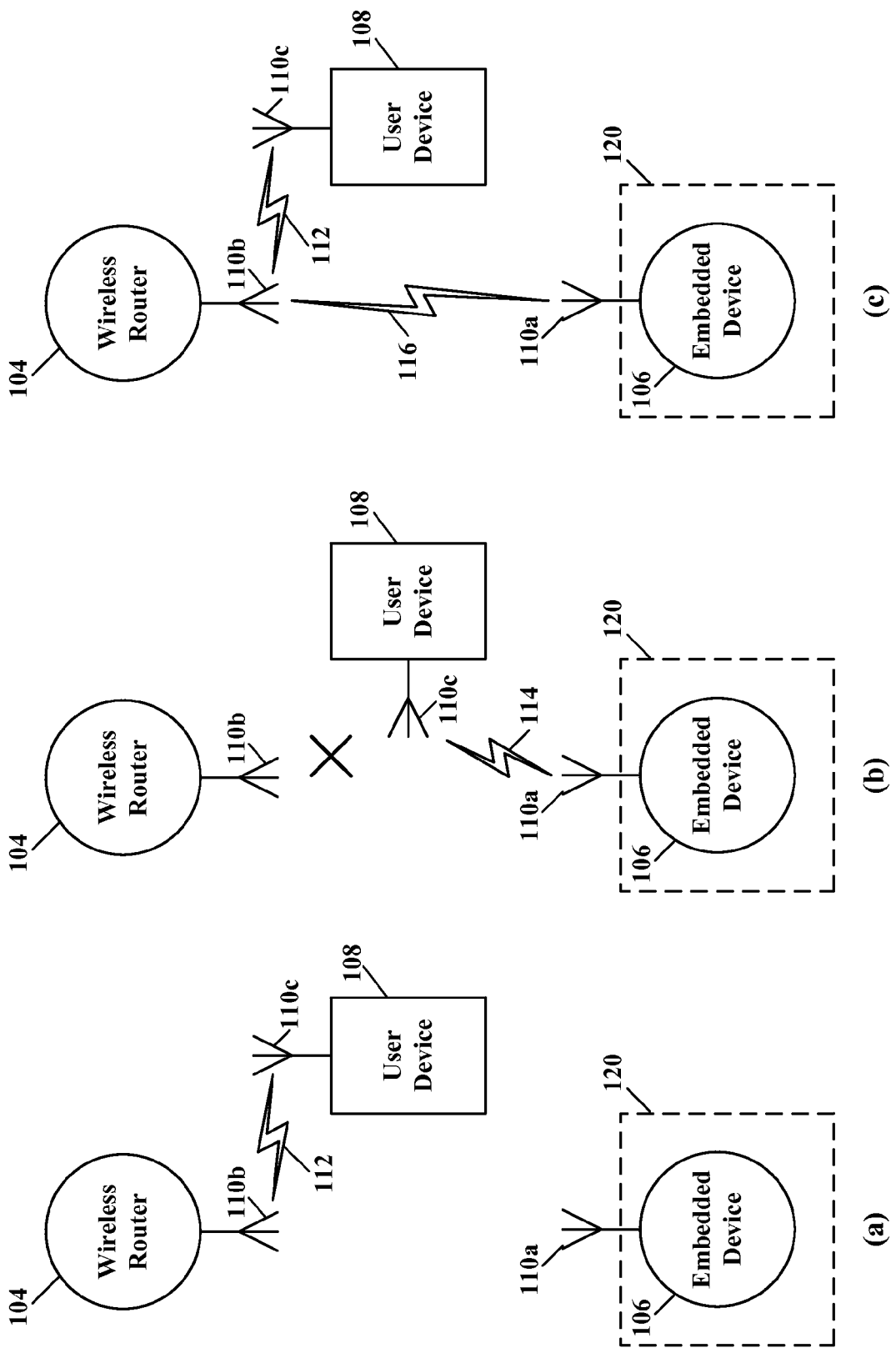
FIG. 1 illustrates schematic communications diagrams of a prior technology method for easy configuration of a Wi-Fi embedded device so that it may become a client of a specific wireless local area network (WLAN)

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, a specially transmitted data packet, beacon, or other broadcast packet from a client connected to the WLAN may be used to send an encrypted equivalent of a last stage Wi-Fi protected setup (WPS) transfer that may provide network commissioning information to the Wi-Fi embedded device so that it may automatically connect to the WLAN.

According to various embodiments, a consumer appliance or product having a Wi-Fi embedded device may be connected to a WLAN without users having to change networks on their "personal device" e.g., personal computer, tablet computer, smart phone, etc., or having to access the Wi-Fi embedded device in any way, e.g., transparent setup and connection to the user. This operation may require installation of an application (App) on the user's personal device and/or accessing a web based application via the personal device.

A simplified connection to a Wi-Fi device, in particular, an embedded Wi-Fi device, to a WLAN may be done by smart clients looking for and connecting to the Wi-Fi device using standard IEEE 802.11 protocols. However according to various embodiments of this disclosure, the aforementioned connection procedure may be reversed so that the Wi-Fi device may be looking for a smart client that will give it the information directly without requiring a prior connection thereto.

Referring now to the drawings, the details of specific example embodiments are schematically illustrated. Like elements in the drawings will be represented by like numbers, and similar elements will be represented by like numbers with a different lower case letter suffix.

Figure 2:
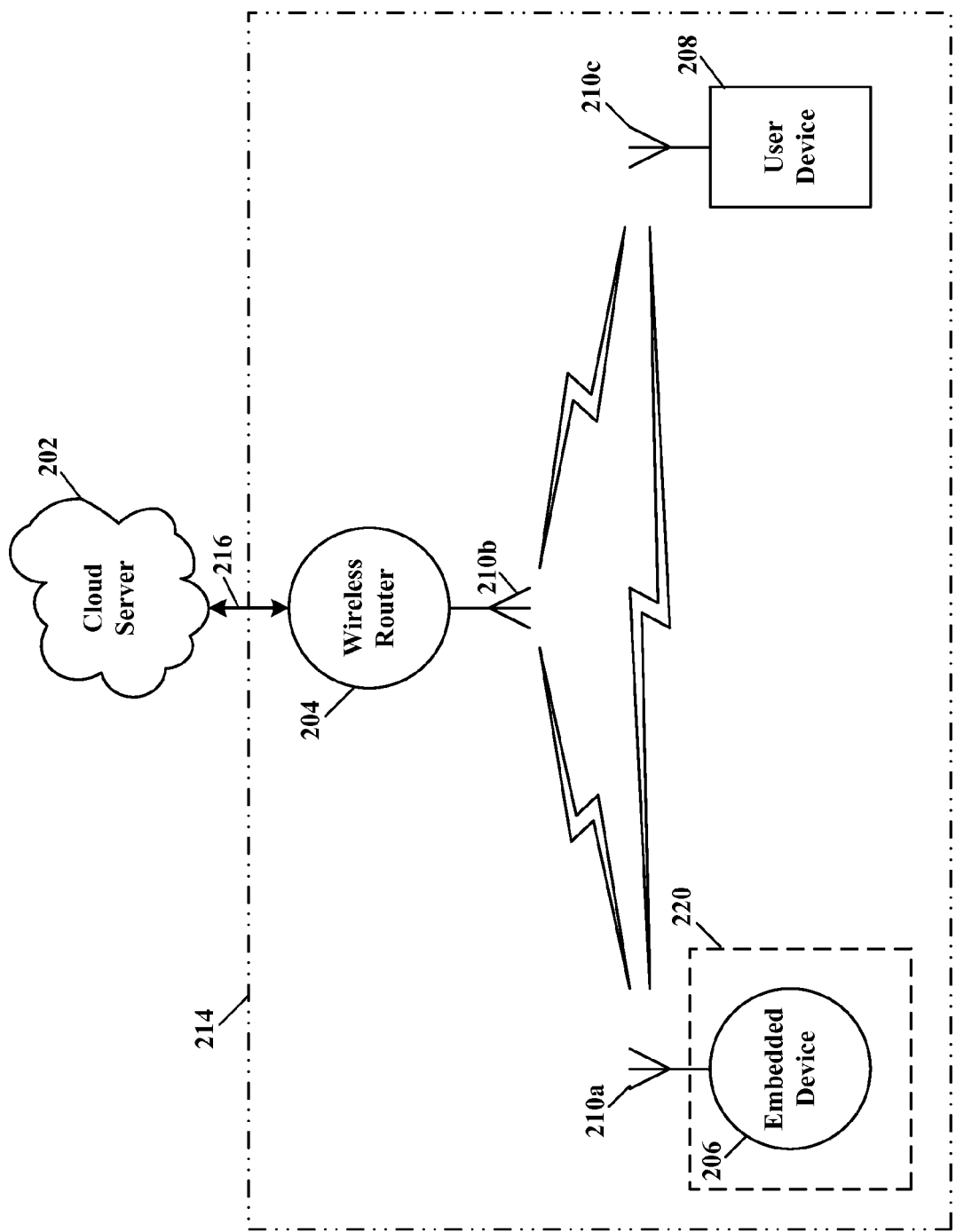
FIG. 2 illustrates a schematic block diagram of a system for wireless easy connect, according to specific example embodiments of this disclosure.

Referring to FIG. 2, depicted is a schematic block diagram of a system for wireless easy connect, according to specific example embodiments of this disclosure. A wireless local area network (WLAN) 214 may comprise a wireless router 204 having a radio frequency (RF) antenna 210b adapted to wirelessly communication with a client user device 208 having a RF antenna 210c, and an embedded device 206 having a RF antenna 210a. The wireless router 204 may also be coupled to, for example but is not limited to, an Internet cloud server 202 with an Internet (e.g., Ethernet) connection 216. The embedded device 206 may be integral with a product or appliance 220, e.g., toaster, refrigerator, oven, washing machine, clothes dryer, thermostat, security system, baby monitor, telephone answering machine, electric car charger, sprinkler system, iron, vacuum, warming tray, coffee pot, light, etc. The user device 208 may be, for example but is not limited to, a smart phone, a personal computer, a laptop computer, a tablet computer, a game box (e.g., Xbox Sony Play Station, etc.), a smart television, etc.

Operation of the system for wireless easy connect shown in FIG. 2 may comprise the following general steps:
1. The embedded device 206 may be powered on in the vicinity of a desired WLAN 214 that may already have a client user device 208 wirelessly attached thereto.
2. An exchange of information in either direction between the embedded device 206 and the user device 208 may occur, which may be used to identify both to each other. Once this identification process is done, and after a possible authentication step, the user device 208 may send network commissioning information in an encrypted format to the embedded device 206.

Figure 3:
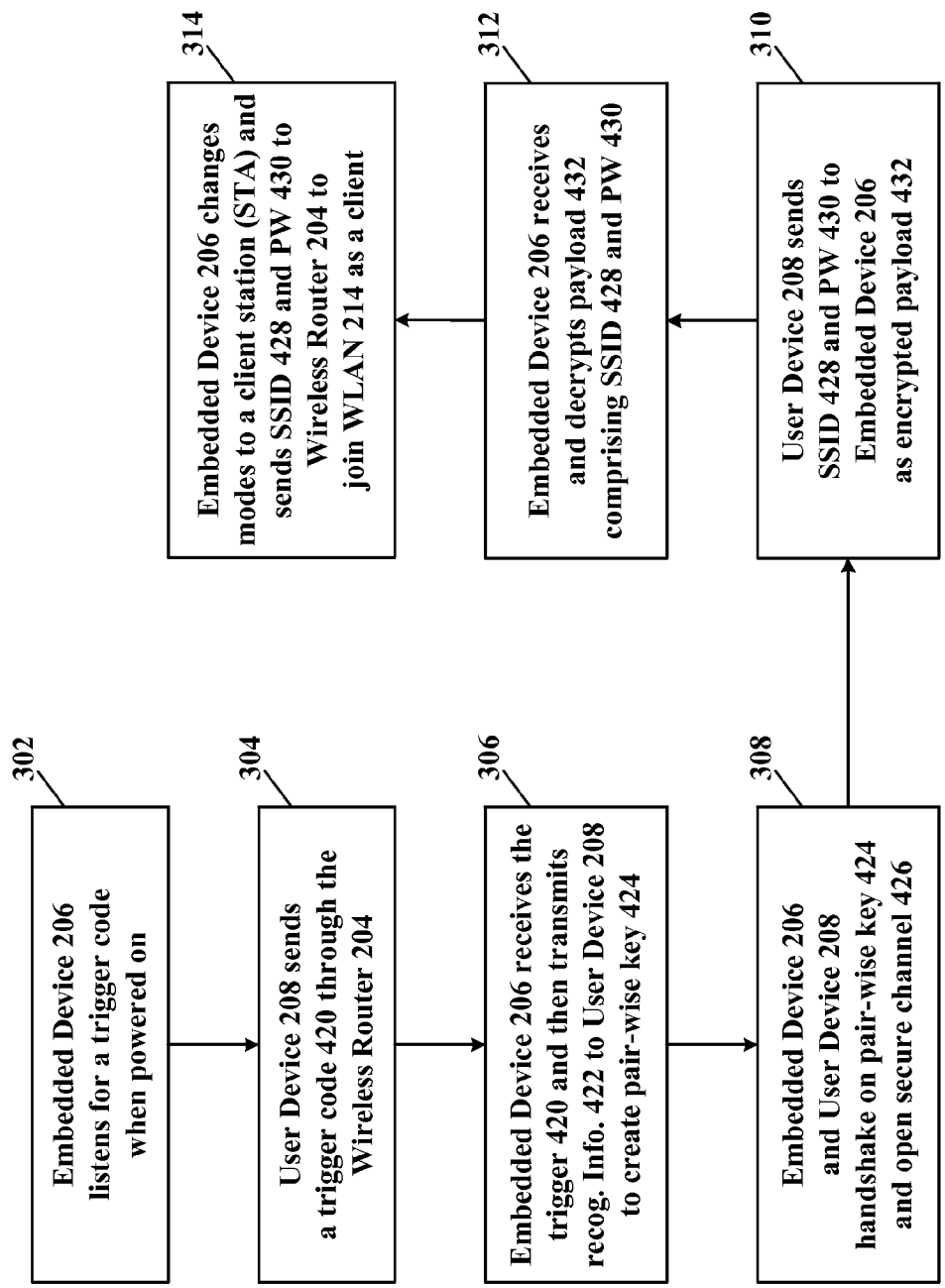
FIGS. 3, 4 and 4A illustrate schematic communications and process flow diagrams of a connection protocol for wireless easy connect, according to a specific example embodiment of this disclosure.
Figure 4:
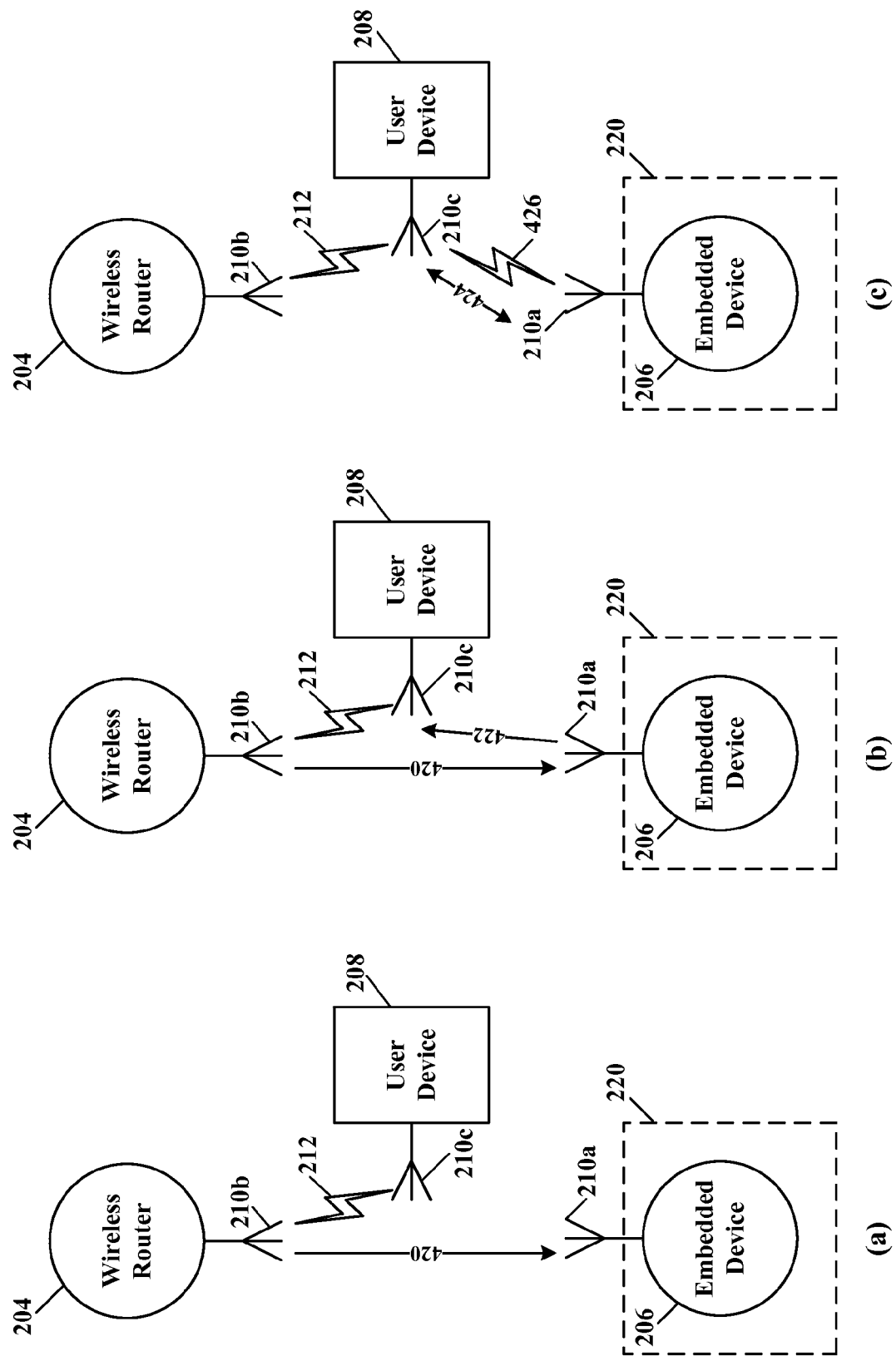
Figure 4A:
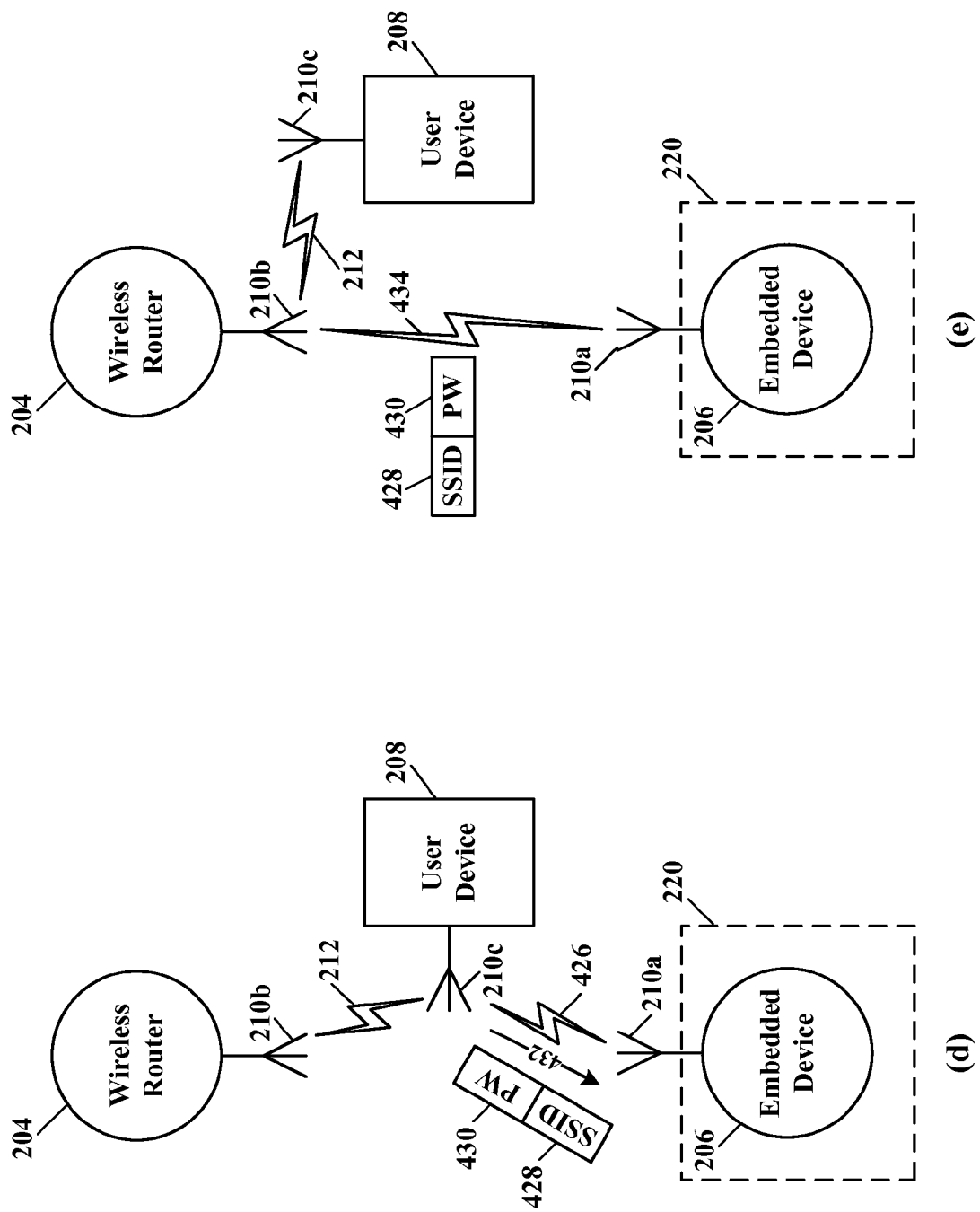

Referring to FIGS. 3, 4 and 4A, depicted are schematic process flow and communications diagrams of a connection protocol for wireless easy connect, according to a specific example embodiment of this disclosure. In step 302, an embedded device 206 listens for a trigger code when powered on. In steps 304, a user device 208 may use an installed application or a web based application to cause the wireless router 204 to broadcast a trigger 420 that may be received by the embedded device 206 (FIG. 4(a)). In steps 306, the received trigger 420 may cause the embedded device 206 to transmit recognition information 422 to the user device 208 (FIG. 4(b)) for creating a pair-wise key 424 with the user device 208. In steps 308, the embedded device 206 and the user device 208 may handshake on the pair-wise key 424 and may open a secure communications channel 426 (FIG. 4(c)). Note that the embedded device 206 may still be in an unconnected state to the wireless router 204 and may just be using beacons, data packet transfers or broadcasts for the secure communications channel 426, or be in a software access point (SoftAP) mode and communicating with user device 208. In steps 310, the user device 208 may send wireless router access information, e.g., a service set identification (SSID) 428 and password (PW) 430, to the embedded device 206 as a payload 432, encrypted or non-encrypted, (FIG. 4A(d)) for attaching to the wireless router 204. In steps 312, the embedded device 206 receives and may decrypt the payload 432 comprising the SSID 428 and the PW 430. In steps 314, the embedded device 206 may change modes to become a client station (STA) and may then send the wireless router access information, e.g., SSID 428 and PW 430, necessary to join the desired WLAN 214 as a client over communications channel 434 to the wireless router 204 (FIG. 4A(e)).

Figure 5:
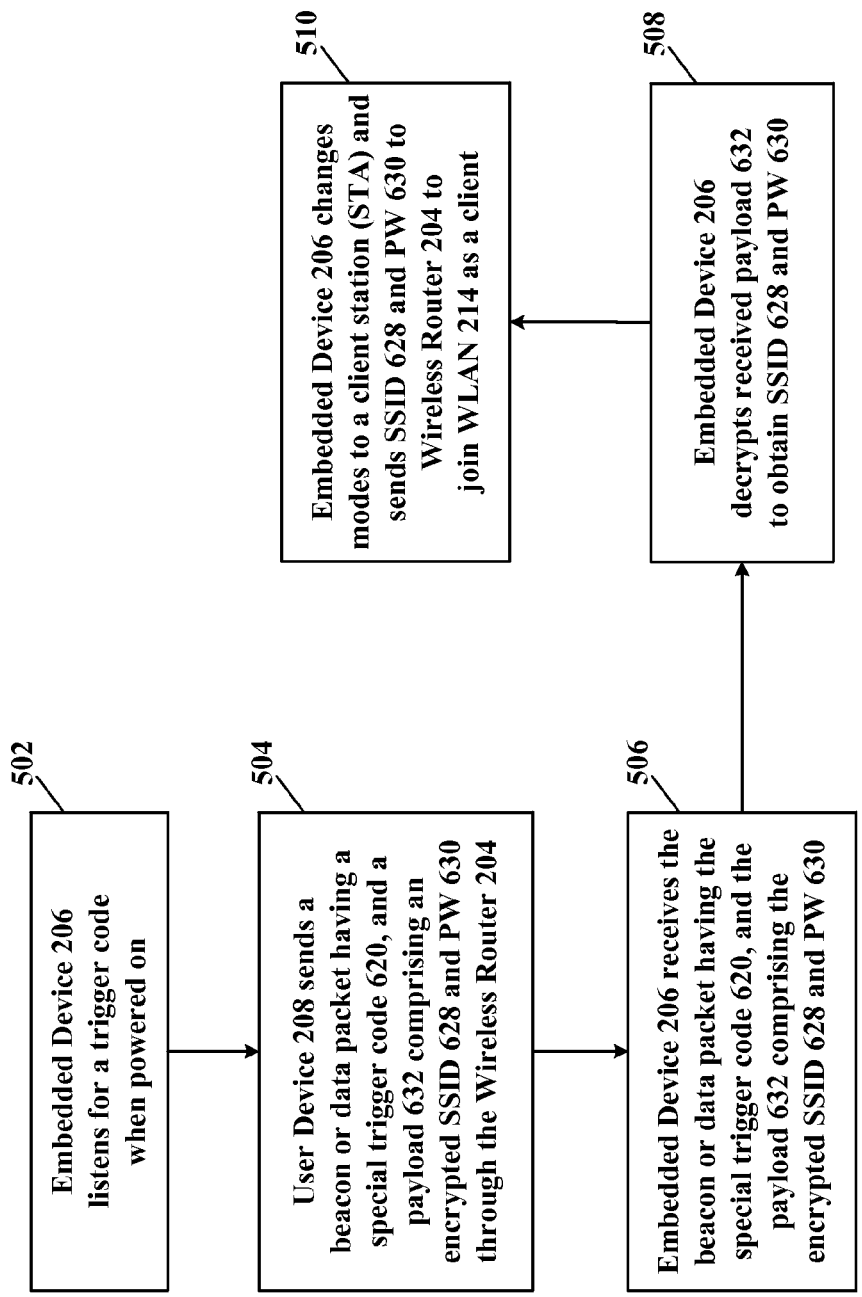
FIGS. 5 and 6 illustrate schematic communications and process flow diagrams of a connection protocol for wireless easy connect, according to another specific example embodiment of this disclosure.
Figure 6:
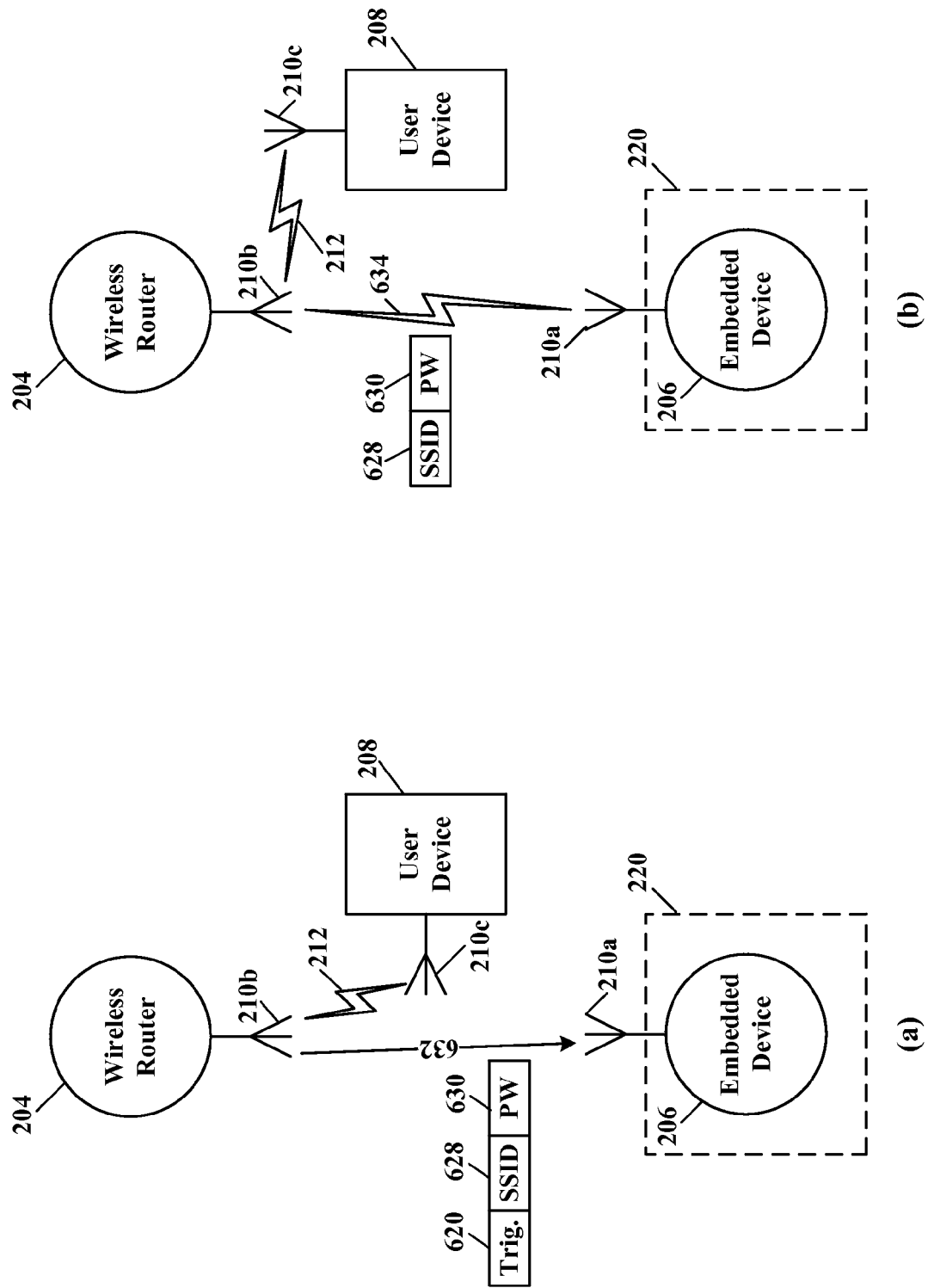

Referring to FIGS. 5 and 6, depicted are schematic communications and process flow diagrams of a connection protocol for the wireless easy connect, according to another specific example embodiment of this disclosure. In step 502, an embedded device 206 listens for a trigger code when powered on. In steps 504, a user device 208 may use an installed application or a web based application to cause the wireless router 204 to broadcast a beacon or data packet 632 that may comprise: 1) a special trigger 620 unique to the embedded device 206, and 2) a payload that may comprise an encrypted SSID 628 and a password 630 (FIG. 6(a)). In steps 506, the embedded device 206 receives the beacon or data packet 632 identified by the trigger code 620, and the payload (e.g., SSID 628 and PW 630). In step 508, the embedded device 206 may decrypt the received SSID 628 and PW 630 from the payload. In steps 510, the embedded device 206 may change modes to become a client station (STA) and may then send the wireless router access information, e.g., SSID 428 and PW 430, necessary to join the desired WLAN 214 as a client over communications channel 634 to the wireless router 204 (FIG. 6(b)).

In the embodiments shown in FIGS. 3-6, the embedded device 206 is passive and listens for a trigger code 420 or 620 before becoming active to hand shake with the user device 208 and/then become a client of the WLAN 214 through the wireless router 204. Some of the newer user devices 206, e.g., "smart phones," can communicate on two channels on a time division multiplexed basis, thus simultaneous connection to radio channels 212 and 426 (FIG. 4A(d)) may be provided with the smart phone.

Figure 7:
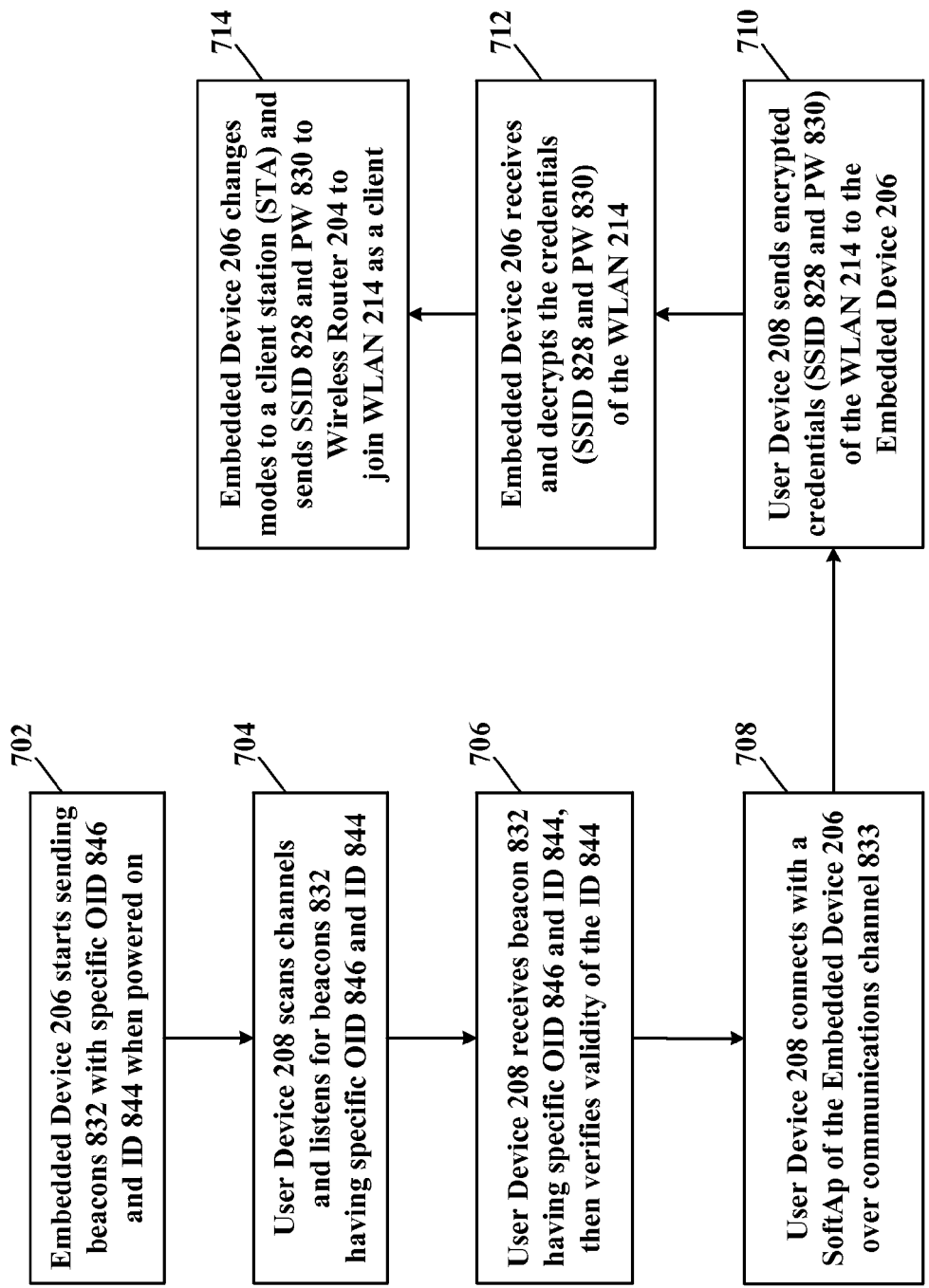
Figure 8:
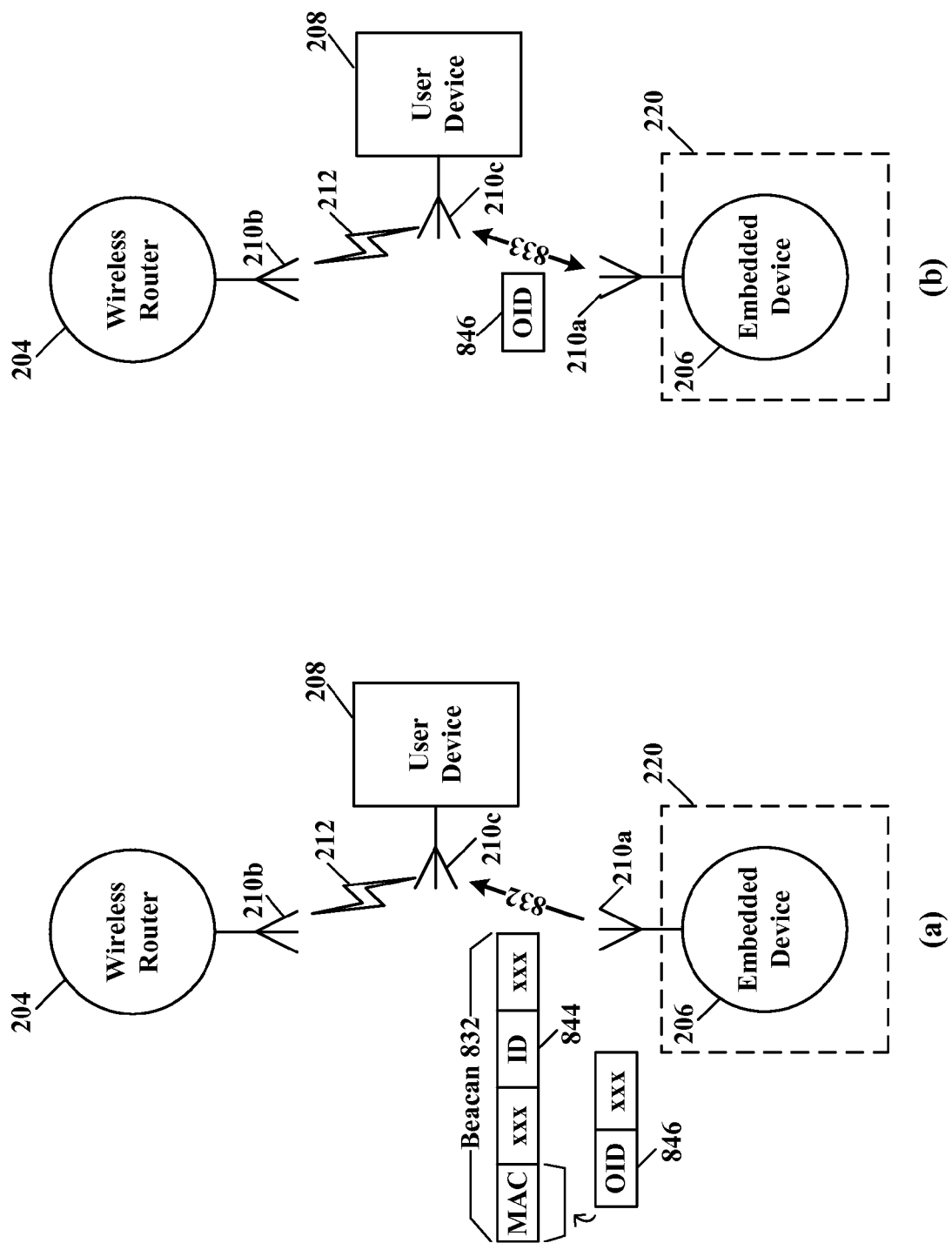
Figure 9:
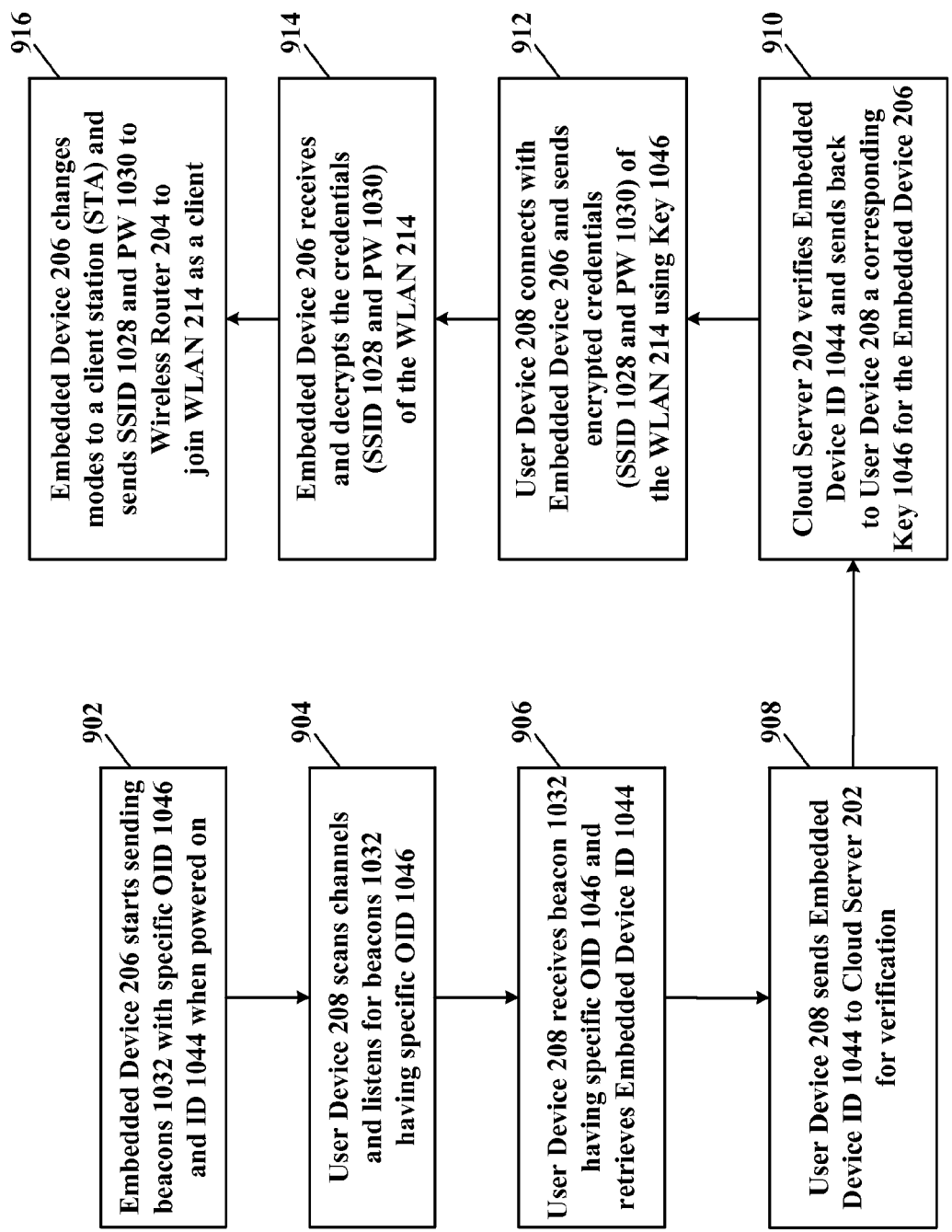
Figure 10:
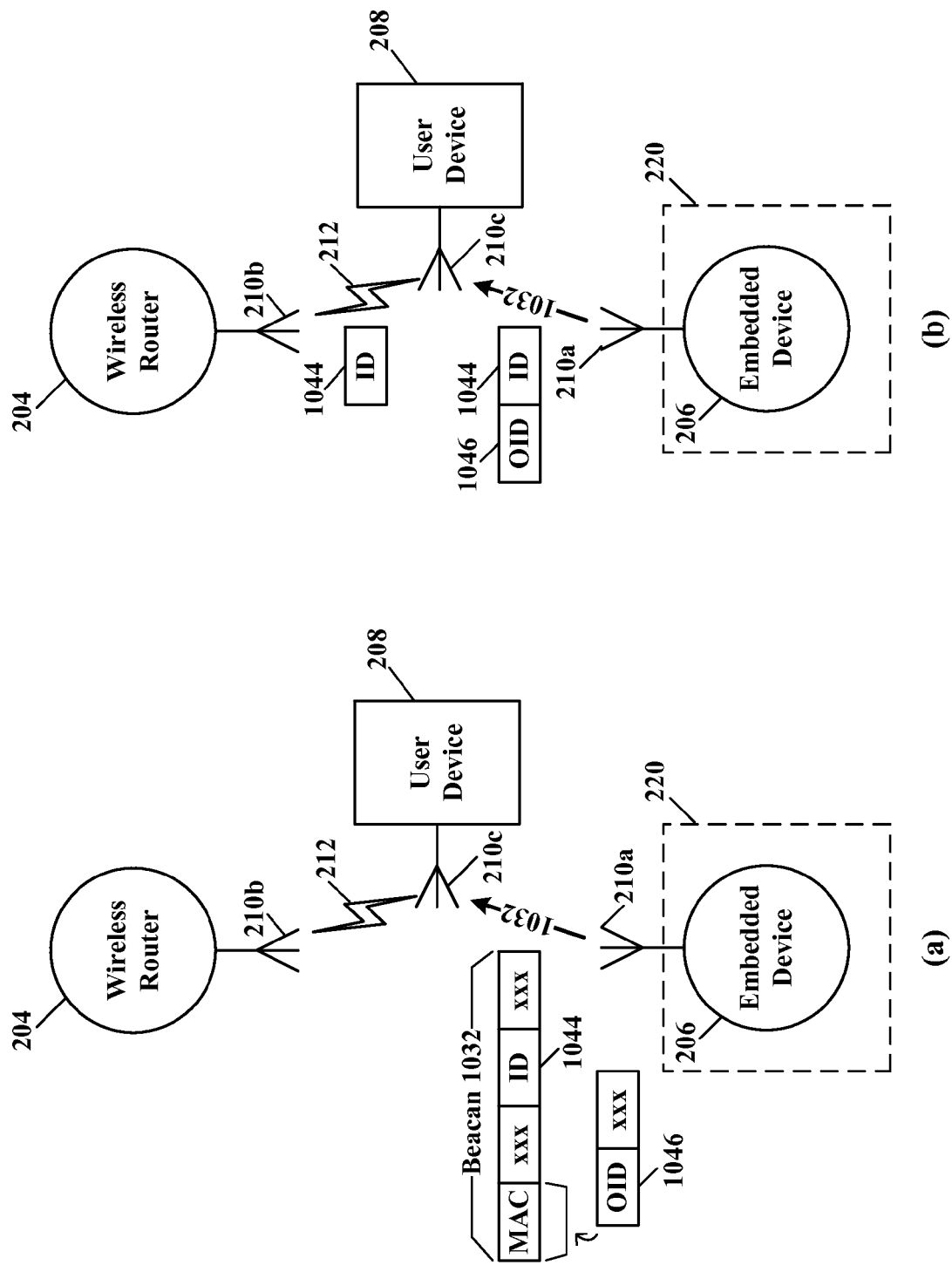
Figure 10A:
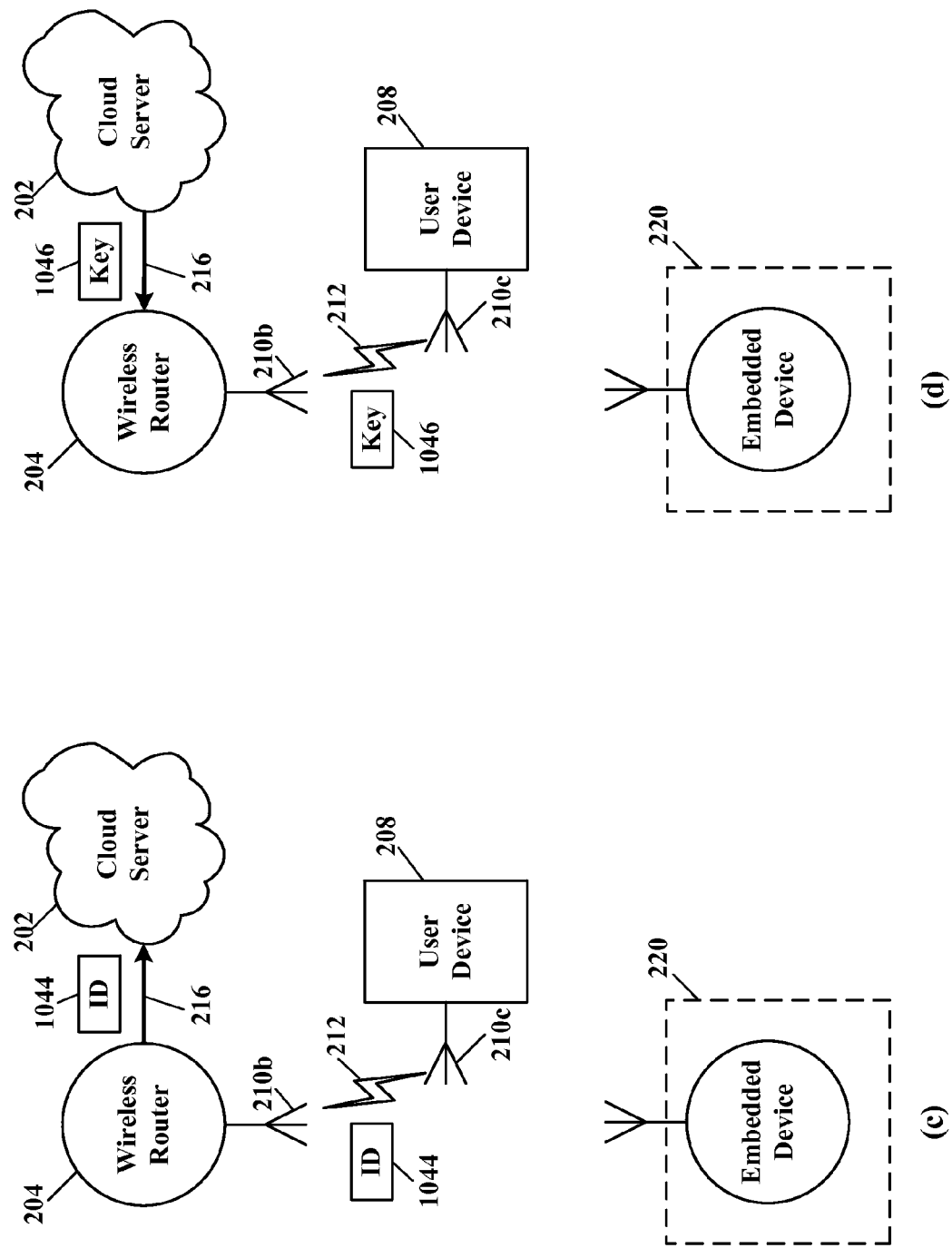

Referring to FIGS. 7, 8 and 8A, depicted are schematic communications and process flow diagrams of a connection protocol for the wireless easy connect, according to yet another specific example embodiment of this disclosure. In steps 702, an embedded device 206 may run a software application making it operate as a software access point, e.g., SoftAP, initially when powered on and may send connection information that may comprise beacons 832 having a specific object identifier (OID) 846 and embedded device identification (ID) 844 (FIG. 8(a)). In steps 704, a user device 208 may scan channels listening for connection information that may comprise beacons 832 having the specific OID 846 and ID 844. In steps 706, when the user device 208 receives the connection information that may comprise the beacon 832 (OID 846 and ID 844) from the embedded device 206, the user device 208 may then verify validity of the embedded device ID 844. In step 708, after verification of the embedded device ID 844, the user device 208 may connect with the embedded device 206 SoftAp over a two way communications link 833 (FIG. 8(b)). In steps 710, the user device 208 may send to the embedded device 206 encrypted credentials (wireless router access information)(SSID 828 and security PW 830) of the wireless router 204 for the WLAN 214 (FIG. 8A(c)). In steps 712 the embedded device 206 may decrypt the received encrypted credentials (wireless router access information)(SSID 828 and security PW 830) of the wireless router 204. In steps 714, the embedded device 206 may change modes to become a client station (STA) and may then send the wireless router access information, e.g., SSID 828 and PW 830, necessary to join the desired WLAN 214 as a client over communications channel 834 to the wireless router 204 (FIG. 8A(d)).

Referring to FIGS. 9, 10, 10A and 10B, depicted are schematic communications and process flow diagrams of a connection protocol for the wireless easy connect, according to still another specific example embodiment of this disclosure. In steps 902, an embedded device 206 may run as a software access point, e.g., SoftAP, initially when powered on and may send connection information that may comprise beacons 1032 having a specific object identifier (OID) 1046 and embedded device identification (ID) 1044 (FIG. 10(a)). In steps 904, a user device 208 may scan channels listening for connection information that may comprise beacons 1032 having the specific OID 1046. In steps 906, when the user device 208 hears connection information that may comprise beacons 1032 having the specific OID 1046, the embedded device identification ID 1044 may be retrieved by the user device 208 (FIG. 10(b)). In step 908, the user device 208 sends the retrieved ID 1044 to a cloud server 202 through the wireless router 204 and Internet (e.g., Ethernet) connection 216 (FIG. 10A(c)). In steps 910 the cloud server 202 may check the validity of the embedded device's ID 1044 and may send back a corresponding key 1046 for the embedded device 206 to the user device 208 (FIG. 10A(d)). In steps 912, the user device 208 may connect to the embedded device 206 (software application/embedded device) and may send over a communications channel 1033 encrypted credentials (wireless router access information)(SSID 1028 and security PW 1030) of the wireless router 204 using the key 1046 from the cloud server 202 (FIG. 10B(e)). In steps 914, the embedded device 206 may retrieve and may decrypt the credentials (wireless router access information)(SSID 1028 and security PW 1030) of the wireless router 204. In steps 916, the embedded device 206 may change modes to become a client station (STA) and may then send the wireless router access information, e.g., SSID 1028 and security PW 1030, necessary to join the desired WLAN 214 as a client over communications channel 1034 to the wireless router 204 (FIG. 10B(f)).

In the embodiments shown in FIGS. 7-10, the embedded device 206 is active as a software application, e.g., SoftAP, initially and keeps sending connection information, e.g., beacons 832/1032 with a specific object identifier (OID) 836/1036 and embedded device identification (ID) 834/1034. Until it receives the credentials (SSID and security PW) of the wireless router 204 and then changes mode to a client station (STA) to connect to the wireless router 204 using the SSID and security, e.g., password thereof. Some of the newer user devices 206, e.g., "smart phones," can communicate on two channels on a time division multiplexed basis, thus simultaneous connection to radio channels 212 and 833/1033 may be provided.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for connecting a wireless device to a wireless network, said method comprising the steps of:
   listening for a trigger code when the wireless device is powered on;
   sending the trigger code from a user device, wherein the trigger code is sent through a wireless router of the wireless network;
   receiving the trigger code with the wireless device;
   transmitting recognition information from the wireless device to the user device;
   creating a pair-wise key from the recognition information;
   handshaking on the pair-wise key between the wireless device and the user device;
   sending wireless router access information from the user device;
   receiving the wireless router access information with the wireless device; and
   sending the wireless router access information from the wireless device to the wireless router to join the wireless network as a client.

2. The method according to claim 1, wherein the user device is selected from the group consisting of a personal computer, a laptop computer, a tablet computer, a game box, and a smart television.

3. The method according to claim 1, wherein the wireless router access information is a payload comprising a service set identification (SSID) and a password (PW).

4. The method according to claim 1, further comprising the steps of:
   encrypting the wireless router access information before the step of sending; and decrypting the wireless router access information after the step of receiving the wireless router access information.

5. The method according to claim 1, wherein the step of sending the wireless router access information from the wireless device to the wireless router comprises the steps of changing mode of the wireless device to a client station and then sending the wireless router access information from the wireless device to the wireless router to join the wireless network.

6. The method according to claim 1, wherein the wireless network is a wireless local area network (WLAN).

7. The method according to claim 1, wherein the wireless device is embedded in a product.

8. The method according to claim 7, wherein the product is selected from the group consisting of a thermostat, a security system, a baby monitor, a telephone answering machine, an electric car charger, a sprinkler system, and a light.

9. The method according to claim 1, wherein the wireless device is embedded in an appliance.

10. The method according to claim 9, wherein the appliance is selected from the group consisting of a toaster, refrigerator, oven, washing machine, a warming tray, a coffee pot, an iron, a vacuum, and a clothes dryer.

11. The method according to claim 1, wherein the user device is a smart phone.

12. A method for connecting a wireless device to a wireless network, said method comprising the steps of:
listening for a trigger code when the wireless device is powered on;
sending connection information comprising a trigger code and a payload from a user device, wherein the payload comprises wireless router access information, wherein the trigger code and the payload are sent through a wireless router of the wireless network;
receiving the connection information with the wireless device; and
sending the wireless router access information from the wireless device to the wireless router to join the wireless network as a client.

13. The method according to claim 12, wherein the user device is a smart phone.

14. The method according to claim 12, wherein the user device is selected from the group consisting of a personal computer, a laptop computer, a tablet computer, a game box, and a smart television.

15. The method according to claim 12, wherein the wireless router access information comprises a service set identification (SSID) and a password (PW).

16. The method according to claim 12, further comprising the steps of:
encrypting the payload before the step of sending; and
decrypting the payload after the step of receiving the connection information.

17. The method according to claim 12, wherein the step of sending the wireless router access information from the wireless device to the wireless router comprises the steps of changing a mode of the wireless device to a client station and then sending the wireless router access information from the client station wireless device to the wireless router to join the wireless network.

18. The method according to claim 12, wherein the wireless network is a wireless local area network (WLAN).

19. The method according to claim 12, wherein the wireless device is embedded in a product.

20. The method according to claim 19, wherein the product is selected from the group consisting of a thermostat, a security system, a baby monitor, a telephone answering machine, an electric car charger, a sprinkler system, and a light.

21. The method according to claim 12, wherein the wireless device is embedded in an appliance.

22. The method according to claim 21, wherein the appliance is selected from the group consisting of a toaster, refrigerator, oven, washing machine, a warming tray, a coffee pot, an iron, a vacuum, and a clothes dryer.

23. A method for connecting a wireless device to a wireless network, said method comprising the steps of:
sending connection information from the wireless device, wherein the connection information is sent through a wireless router of the wireless network;
listening for the connection information with a user device;
verifying validity of the connection information;
connecting the user device to the wireless device when the connection information is validated;
sending wireless router access information from the user device;
receiving the wireless router access information with the embedded device; and
sending the wireless router access information from the wireless device to the wireless router to join the wireless network as a client.

24. The method according to claim 23, wherein the user device is a smart phone.

25. The method according to claim 23, wherein the user device is selected from the group consisting of a personal computer, a laptop computer, a tablet computer, a game box, and a smart television.

26. The method according to claim 23, wherein the connection information comprises beacons having a specific object identifier (OID) and embedded device identification (ID).

27. The method according to claim 26, wherein the step of listening for the connection information from the wireless device comprises the steps of scanning channels with the user device and listening for the beacons having the specific OID and ID.

28. The method according to claim 23, wherein wireless router access information comprises a service set identification (SSID) and a password (PW).

29. The method according to claim 23, further comprising the steps of:
encrypting the wireless router access information before the step of sending from the user device; and
decrypting the wireless router access information after the step of receiving with the embedded device.

30. The method according to claim 23, wherein the step of sending the wireless router access information from the wireless device to the wireless router comprises the steps of changing a mode of the wireless device to a client station and then sending the wireless router access information from the client station wireless device to the wireless router to join the wireless network.

31. The method according to claim 23, wherein the wireless network is a wireless local area network (WLAN).

32. The method according to claim 23, wherein the wireless device is embedded in a product.

33. The method according to claim 32, wherein the product is selected from the group consisting of a thermostat, a security system, a baby monitor, a telephone answering machine, an electric car charger, a sprinkler system, and a light.

34. The method according to claim 23, wherein the wireless device is embedded in an appliance.

35. The method according to claim 34, wherein the appliance is selected from the group consisting of a toaster, refrigerator, oven, washing machine, a warming tray, a coffee pot, an iron, a vacuum, and a clothes dryer.

36. The method according to claim 26, wherein the step of verifying validity of the connection information further comprising the steps of:
   sending the embedded device identification (ID) to a verification server; and
   receiving a key from the verification server for the embedded device when the ID is verified.

37. The method according to claim 36, further comprising the step of sending the wireless router access information and the key to the embedded device.

38. The method according to claim 36, wherein the verification server is an Internet cloud server.

\* \* \* \* \*